United States Patent
Nakatsuka et al.

(10) Patent No.: US 11,327,491 B2
(45) Date of Patent: May 10, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Makoto Nakatsuka, Wako (JP); Nobuyuki Watanabe, Wako (JP); Seiichi Yamamoto, Tokyo (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 16/297,751

(22) Filed: Mar. 11, 2019

(65) Prior Publication Data
US 2019/0286136 A1    Sep. 19, 2019

(30) Foreign Application Priority Data

Mar. 14, 2018    (JP) .............................. JP2018-046720

(51) Int. Cl.
| | |
|---|---|
| G05D 1/00 | (2006.01) |
| G05D 1/02 | (2020.01) |
| B60L 53/36 | (2019.01) |
| B60L 53/12 | (2019.01) |
| G06N 3/08 | (2006.01) |

(52) U.S. Cl.
CPC ............ *G05D 1/0088* (2013.01); *B60L 53/36* (2019.02); *G05D 1/0221* (2013.01); *G05D 1/0223* (2013.01); *B60L 53/12* (2019.02); *G05D 1/0246* (2013.01); *G05D 1/0257* (2013.01); *G05D 2201/0213* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 6,421,600 B1 * | 7/2002 | Ross | B60L 50/51 701/117 |
| 9,950,708 B1 * | 4/2018 | Cullinane | B60W 30/095 |

(Continued)

FOREIGN PATENT DOCUMENTS

| | | |
|---|---|---|
| CN | 105705395 | 6/2016 |
| CN | 107223101 | 9/2017 |
| JP | 2001-043498 | 2/2001 |

OTHER PUBLICATIONS

Chinese Office Action for Chinese Patent Application No. 201910183569.9 dated Jan. 6, 2022.

*Primary Examiner* — Peter D Nolan
*Assistant Examiner* — Demetra R Smith-Stewart
(74) *Attorney, Agent, or Firm* — Amin, Turocy & Watson, LLP

(57) ABSTRACT

A vehicle control device includes a recognition unit that recognizes a surrounding situation of a vehicle, and a driving control unit that controls one or both of steering or acceleration and deceleration of the vehicle based on the surrounding situation recognized by the recognition unit. The driving control unit determines whether or not an occupant is riding in the vehicle, and differentiates a road on which the vehicle is caused to travel, between a case where it is determined that the occupant is riding in the vehicle and a case where it is determined that the occupant is not riding in the vehicle.

7 Claims, 9 Drawing Sheets

(56) References Cited

U.S. PATENT DOCUMENTS

| | | | |
|---|---|---|---|
| 10,005,367 B2* | 6/2018 | Lee | H02J 7/025 |
| 2016/0138925 A1 | 5/2016 | Takahashi | |
| 2016/0264131 A1 | 9/2016 | Chan et al. | |
| 2017/0267256 A1 | 9/2017 | Minster et al. | |
| 2017/0355275 A1* | 12/2017 | Kwasnick | B60L 53/124 |
| 2018/0037136 A1* | 2/2018 | Nelson | B60L 50/53 |
| 2019/0019413 A1* | 1/2019 | Yun | G06K 9/00805 |
| 2020/0072626 A1* | 3/2020 | Kumar | B60L 53/32 |
| 2020/0166939 A1* | 5/2020 | Urano | B60W 30/182 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-046720, filed Mar. 14, 2018, the content of which is incorporated herein by reference.

BACKGROUND

Field of the Invention

The present invention relates to a vehicle control device, a vehicle control method, and a storage medium.

Description of Related Art

In recent years, research on automatically controlling a vehicle has been carried out. In relation to this, a technique in which a single driver drives a plurality of vehicles forming a line is known (for example, Japanese Unexamined Patent Application, First Publication No. 2001-43498).

SUMMARY

However, with the related art, since a vehicle in which an occupant is not riding follows a head vehicle in which an occupant is riding or travels along a past traveling trajectory, the number of vehicles traveling on the same route increases, and thus there is a possibility of causing traffic congestion and the like.

An aspect of the present invention has been made in consideration of such a circumstance, and an object of the aspect of the present invention is to provide a vehicle control device, a vehicle control method, and a storage medium capable of performing more suitable driving control according to whether or not an occupant is riding in a vehicle.

A vehicle control device, a vehicle control method, and a storage medium according to the present invention adopt the following constitutions.

(1): A vehicle control device according to an aspect of the present invention includes a recognition unit that recognizes a surrounding situation of a vehicle, and a driving control unit that controls one or both of steering or acceleration and deceleration of the vehicle based on the surrounding situation recognized by the recognition unit. The driving control unit determines whether or not an occupant is riding in the vehicle, and differentiates a road on which the vehicle is caused to travel, between a case where it is determined that the occupant is riding in the vehicle and a case where it is determined that the occupant is not riding in the vehicle.

(2): In the aspect of (1) described above, in a case where it is determined that the occupant is riding in the vehicle, the driving control unit causes the vehicle to preferentially travel on a first road on which a change of a behavior of the vehicle is small, and in a case where it is determined that the occupant is not riding in the vehicle, the driving control unit causes the vehicle to preferentially travel on a second road on which the change of the behavior of the vehicle is larger as compared with the first road.

(3): In the aspect of (2) described above, the driving control unit adjusts one or both of a traveling degree of the first road or a traveling degree of the second road in a route to a destination based on a surrounding traffic situation of the vehicle recognized by the recognition unit.

(4): In the aspect of (1) described above, the vehicle control device further includes a storage battery that accumulates electric power, and a power receiving device that supplies the electric power to the storage battery by the vehicle traveling on a charging lane for charging the storage battery. In a case where it is determined that the occupant is not riding in the vehicle, the driving control unit causes the vehicle to preferentially travel on the charging lane.

(5): In the aspect of (4) described above, the driving control unit decelerates a speed of the vehicle in a case where the vehicle travels on the charging lane as compared with a case where the vehicle travels on a lane other than the charging lane.

(6): In the aspect of (1) described above, in a case where it is determined that the occupant is not riding in the vehicle, the driving control unit causes the vehicle to preferentially travel on a road with a poor visibility from the vehicle.

(7): A vehicle control method according to an aspect of the present invention is a vehicle control method of causing a vehicle control device to recognize a surrounding situation of a vehicle, control one or both of steering or acceleration and deceleration of the vehicle based on the recognized surrounding situation, determine whether or not an occupant is riding in the vehicle, and differentiate a road on which the vehicle is caused to travel, between a case where it is determined that the occupant is riding in the vehicle and a case where it is determined that the occupant is not riding in the vehicle.

(8): A storage medium according to an aspect of the present invention is a computer-readable non-transitory storage medium storing a program that causes a vehicle control device to recognize a surrounding situation of a vehicle, control one or both of steering or acceleration and deceleration of the vehicle based on the recognized surrounding situation, determine whether or not an occupant is riding in the vehicle, and differentiate a road on which the vehicle is caused to travel, between a case where it is determined that the occupant is riding in the vehicle and a case where it is determined that the occupant is not riding in the vehicle.

According to the aspects of (1) to (8) described above, it is possible to perform more suitable driving control according to whether or not an occupant is riding in a vehicle.

DESCRIPTION OF EMBODIMENTS

Hereinafter, embodiments of a vehicle control device, a vehicle control method, and a storage medium according to the present invention will be described with reference to the drawings. The vehicle control device of the embodiment is applied to an automated driving vehicle. Automated driving is, for example, executing driving control by controlling one or both of steering or acceleration and deceleration of a vehicle. It is assumed that the vehicle control device of the embodiment is capable of automated driving in an unmanned state or a manned state. The unmanned state is a state in which even a single occupant including not only an occupant (driver) who operates a driving operation element but also an occupant (non-driver) who does not operate the driving operation element is not riding in the vehicle. On the other hand, the manned state is a state in which one or more occupants are riding in a vehicle including the driver or the non-driver. In the following, a case where a law on a left-hand side is applied will be described, but in a case where a law on a right-hand side is applied, it is only necessary to reverse the left and right.

First Embodiment

[Overall Constitution]

Figure 1:
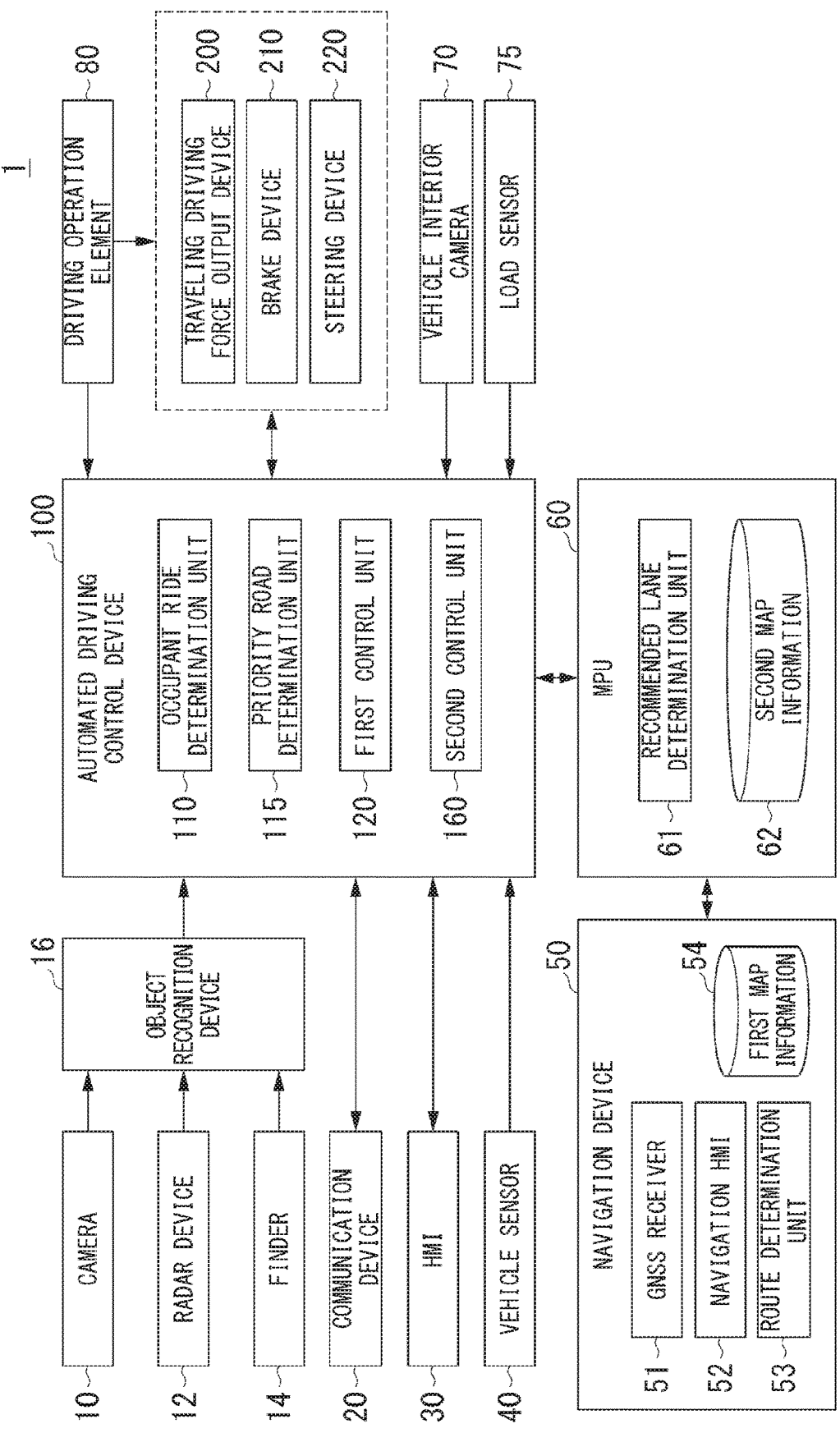
FIG. 1 is a constitution diagram of a vehicle system using a vehicle control device according to a first embodiment.

FIG. 1 is a constitution diagram of a vehicle system 1 using the vehicle control device according to a first embodiment. A vehicle in which the vehicle system 1 is mounted is, for example, a vehicle such as a two-wheeled vehicle, a three-wheeled vehicle, or a four-wheeled vehicle, and a driving source of the vehicle is an internal combustion engine such as a diesel engine or a gasoline engine, an electric motor, or a combination thereof. The electric motor operates using electric power generated by a generator connected to the internal combustion engine or electric power discharged by a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a vehicle interior camera 70, a load sensor 75, a driving operation element 80, an automated driving control device 100, a traveling driving force output device 200, a brake device 210, and a steering device 220. Such devices and instruments are connected to each other by a multiple communication line such as a controller area network (CAN) communication line, a serial communication line, a wireless communication network, or the like. The constitution shown in FIG. 1 is merely an example, and a part of the constitution may be omitted or another constitution may be further added. The automated driving control device 100 is an example of a "vehicle control device".

For example, the camera 10 is a digital camera using a solid imaging element such as a charge coupled device (CCD) or a complementary metal oxide semiconductor (CMOS). The camera 10 is attached to an arbitrary place on the vehicle (hereinafter, a subject vehicle M) in which the vehicle system 1 is mounted. In a case of forward imaging, the camera 10 is attached to an upper portion of a front windshield, a rear surface of a rearview mirror, or the like. For example, the camera 10 periodically repeats imaging of the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. The radar device 12 is attached to an arbitrary place on the subject vehicle M. The radar device 12 may detect the position and the speed of the object by a frequency modulated continuous wave (FM-CW) method.

The finder 14 is a light detection and ranging (LIDAR). The finder 14 irradiates light around the subject vehicle M and measures scattered light. The finder 14 detects the distance to the object on the basis of a time from light emission to light reception. For example, the irradiated light is laser light of a pulse shape. The finder 14 is attached to an arbitrary place on the subject vehicle M.

The object recognition device 16 performs a sensor fusion process on a detection result by a part or all of the camera 10, the radar device 12, and the finder 14 to recognize a position, a type, a speed, and the like of the object. The object recognition device 16 outputs a recognition result to the automated driving control device 100. The object recognition device 16 may output the detection result of the camera 10, the radar device 12, and the finder 14 as they are to the automated driving control device 100. The object recognition device 16 may be omitted from the vehicle system 1. The camera 10 includes an infrared camera that images a change of a surface temperature of an object, in addition to a camera that captures a normal image. The camera 10 may be switched between normal imaging and infrared imaging by a function of the camera 10.

For example, the communication device 20 communicates with another vehicle (surrounding vehicle) that is present around the subject vehicle M using a cellular network, a Wi-Fi network, Bluetooth (registered trademark), dedicated short range communication (DSRC), or the like, or communicates with various server devices through a wireless base station.

The HMI 30 presents various types of information to an occupant of the subject vehicle M and receives an input operation by the occupant. The HMI 30 includes various display devices, speakers, buzzers, touch panels, switches, keys, light emitting devices provided in a vehicle interior, and the like.

The vehicle sensor 40 includes a vehicle speed sensor that detects a speed of the subject vehicle M, an acceleration sensor that detects acceleration, a yaw rate sensor that detects an angular velocity around a vertical axis, a direction sensor that detects a direction of the subject vehicle M, and the like.

For example, the navigation device 50 includes a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system (INS) using an output of the vehicle sensor 40. The navigation HMI 52 includes a display device, a speaker, a touch panel, a key, and the like. A part or all of the navigation HMI 52 may be shared with the HMI 30 described later above.

For example, the route determination unit 53 determines a route (hereinafter referred to as an on-map route) from the position of the subject vehicle M specified by the GNSS receiver 51 (or an input arbitrary position) to a destination on the basis of a destination input by the occupant using the navigation HMI 52 in a manned state, a destination transmitted from an external communication terminal in an unmanned state and received by the communication device 20, or a priority road determined by a priority road determination unit 115 which will be described later, by referring to the first map information 54. For example, the first map information 54 is information in which a road shape is expressed by a link indicating a road and nodes connected by the link. The first map information 54 may include information on a road sign for a link. The first map information 54 may include a curvature of the road, point of interest (POI) information, or the like.

The first map information 54 may include information on a section of the charging lane. The charging lane is a lane that supplies electric power to a power receiving device of the vehicle traveling on the lane. The on-map route is output to the MPU 60. The navigation device 50 may perform route guidance using the navigation HMI 52 on the basis of the on-map route. For example, the navigation device 50 may be realized by a function of a terminal device such as a smartphone or a tablet terminal possessed by the occupant. The navigation device 50 may transmit a current position and a destination to a navigation server through the communication device 20 and acquire the same route as the on-map route from the navigation server.

For example, the MPU 60 includes a recommended lane determination unit 61 and holds second map information 62 in the storage device such as an HDD or a flash memory. The recommended lane determination unit 61 divides the on-map route provided from the navigation device 50 into a plurality of blocks (for example, divides the route into intervals of 100 [m] in a vehicle progress direction), and determines a recommended lane for each block by referring to the second map information 62. The recommended lane determination unit 61 determines the number of a lane from the left that the vehicle travels in. In a case where a branching position is present in the on-map route, the recommended lane determination unit 61 determines the recommended lane so that the subject vehicle M is able to travel on a reasonable travel route for progressing to a branch destination.

The second map information 62 is map information with accuracy higher than that of the first map information 54. For example, the second map information 62 may include information on the center of a lane, information on a boundary of a lane, or the like. The second map information 62 may include road information, traffic regulation information, address information (an address and a postal code), facility information, telephone number information, and the like. The second map information 62 may be updated at any time by the communication device 20 communicating with another device.

For example, the vehicle interior camera 70 images the vehicle interior of the subject vehicle M. For example, the interior camera 70 captures an image so that each seating seat installed in the vehicle interior falls within an angle of view. The vehicle interior camera 70 may images a vicinity of each seat. The vehicle interior camera 70 is a digital camera using a solid-state imaging element such as a CCD or a CMOS. For example, the vehicle interior camera 70 periodically images the vehicle interior of the subject vehicle M and outputs the captured image to the automated driving control device 100.

The load sensor 75 detects a load applied to each seat and outputs a detected result to the automated driving control device 100.

The driving operation element 80 includes, for example, an acceleration pedal, a brake pedal, a shift lever, a steering wheel, a modified steering wheel, a joystick, and other operation elements. A sensor that detects an operation amount or presence or absence of an operation is attached to the driving operation element 80, and a detection result of the sensor is output to the automated driving control device 100 or a part or all of the traveling driving force output device 200, the brake device 210, and the steering device 220. A grip sensor that detects whether or not the occupant grips the steering wheel may be attached to the steering wheel.

For example, the automated driving control device 100 includes an occupant ride determination unit 110, the priority road determination unit 115, a first control unit 120, and a second control unit 160. For example, each of such constitution elements is realized by a hardware processor such as a central processing unit (CPU) executing a program (software). Some or all of such constitution elements may be realized by hardware (a circuit unit including a circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device such as an HDD or a flash memory of the automated driving control device 100 in advance. Alternatively, the program may be stored in a detachable storage medium such as a DVD or a CD-ROM and may be installed in the HDD or the flash memory of the automated driving control device 100 by attachment of the storage medium to a drive device. A combination of the occupant ride determination unit 110, the priority road determination unit 115, the action plan generation unit 140, and the second control unit 160 is an example of a "driving control unit". For example, the driving control unit executes the driving control by controlling one or both of steering or acceleration and deceleration of the subject vehicle M on the basis of the surrounding situation recognized by the recognition unit 130.

Figure 2:
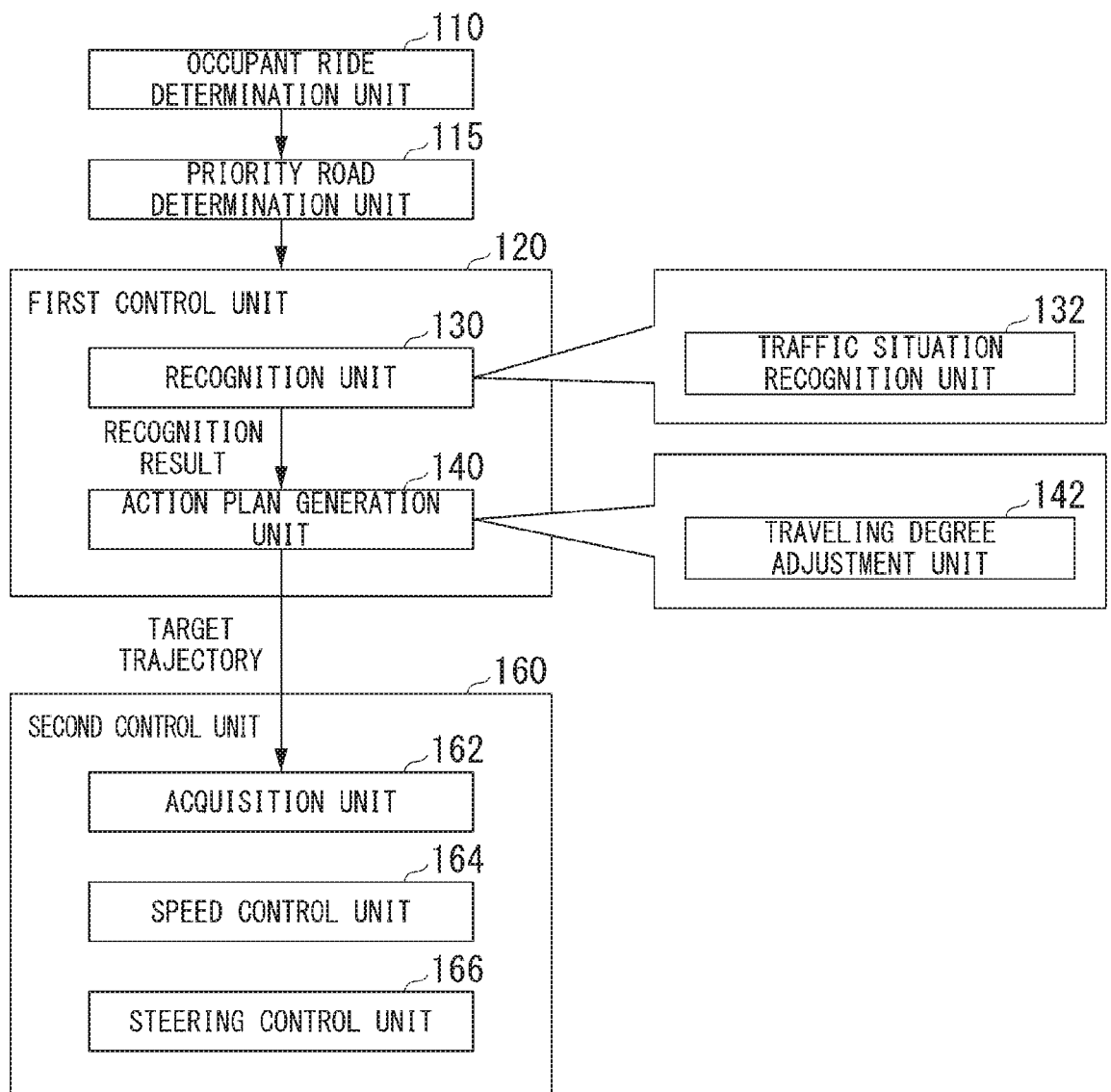
FIG. 2 is a functional constitution diagram of an occupant ride determination unit, a priority road determination unit, a first control unit, and a second control unit.

FIG. 2 is a functional constitution diagram of the occupant ride determination unit 110, the priority road determination unit 115, the first control unit 120, and the second control unit 160. The occupant ride determination unit 110 determines whether or not an occupant is riding in the subject vehicle M. Details of a function of the occupant ride determination unit 110 will be described later. The priority road determination unit 115 determines a priority route among routes along which the subject vehicle M travels to the destination on the basis of a result of the determination by the occupant ride determination unit 110. Details of a function of the priority road determination unit 115 will be described later.

For example, the first control unit 120 includes a recognition unit 130 and an action plan generation unit 140. The recognition unit 130 includes a traffic situation recognition unit 132. The action plan generation unit 140 includes a traveling degree adjustment unit 142. For example, the first control unit 120 realizes a function of artificial intelligence (AI) and a function of a previously given model in parallel. For example, a function of "recognizing an intersection" may be realized by executing recognition of an intersection by deep learning or the like and recognition based on a previously given condition (there is a pattern matching signal, a road sign, or the like) in parallel, giving scores to both sides, and comprehensively evaluating the scores. Therefore, reliability of automated driving is guaranteed.

The recognition unit 130 recognizes states such as the position, the orientation, the speed and the acceleration of the object around the subject vehicle M, on the basis of information input from the camera 10, the radar device 12, and the finder 14 through the object recognition device 16. The object includes, for example, a moving object such as a pedestrian, the surrounding vehicle, or an obstacle of a construction site or the like. The position of the object is recognized as a position in absolute coordinates using a representative point (a center of gravity, a drive shaft center, or the like) of the subject vehicle M as an origin and is used in control. The position of the object may be represented by the representative point such as the center of gravity or a corner of the object, or may be represented by an expressed region. A "state" of the object may include an acceleration or a jerk of the object, or an "action state" (for example, whether or not the object is changing lanes or trying to change lanes).

For example, the recognition unit 130 recognizes a lane (traveling lane) on which the subject vehicle M is traveling. For example, the recognition unit 130 recognizes the traveling lane by comparing a pattern of a road lane marking (for example, an arrangement of a solid line and a broken line) obtained from the second map information 62 with a pattern of a road lane marking around the subject vehicle M recognized from the image captured by the camera 10. The recognition unit 130 may recognize the traveling lane by recognizing a traveling road boundary (a road boundary) including a road lane marking, a road shoulder, a curb stone, a median strip, a guard rail, and the like, and is not limited to recognizing road lane markings. In this recognition, the position of the subject vehicle M acquired from the navigation device 50 or a process result by an INS may be added. The recognition unit 130 may recognize a width, a height, and a shape of the obstacle, a vehicle type, or the like on the basis of the image captured by the camera 10. The recognition unit 130 recognizes a road sign, a red light, a toll gate, a road structure, and other road events.

When recognizing the traveling lane, the recognition unit 130 recognizes the position and a posture of the subject vehicle M with respect to the traveling lane. For example, the recognition unit 130 may recognize an angle formed by a deviation of a reference point of the subject vehicle M from a center of the lane and a line connecting the center of the lane of a progress direction of the subject vehicle M as a relative position and the posture of the subject vehicle M with respect to the traveling lane. Instead of this, the recognition unit 130 may recognize a position of the reference point of the subject vehicle M with respect to one of side end portions (the road lane marking or the road boundary) of the traveling lane, or the like as the relative position of the subject vehicle M with respect to the traveling lane. The recognition unit 130 may recognize a structure (for example, a utility pole, a median strip, and the like) on the road on the basis of the first map information 54 or the second map information 62. A function of the traffic situation recognition unit 132 of the recognition unit 130 will be described later.

The action plan generation unit 140 generates a target trajectory along which the subject vehicle M automatically (without depending on the operation of the driver) travels in the future so that the subject vehicle M travels on the recommended lane determined by the recommended lane determination unit 61 in principle and furthermore the subject vehicle M is able to cope with the surrounding situation of the subject vehicle M. The target trajectory includes, for example, a speed element. For example, the target trajectory is expressed as a sequence of points (trajectory points) where the subject vehicle M reaches. The trajectory point is a point where the subject vehicle M reaches for each predetermined traveling distance (for example, about several [m]) at a road distance, and separately from that, a target speed and a target acceleration for each predetermined sampling time (for example, about 0 comma several [sec]) are generated as part of the target trajectory. For example, the target speed for each sampling time is determined on the basis of a high rank target speed determined for each passing road. For example, the high rank target speed may be determined on the basis of a limit speed or a legal speed, or may be arbitrarily set by the occupant or within a predetermined range from the limit speed or the legal speed. For example, the target speed in the claims corresponds to the high rank target speed. The trajectory point may be a position where the subject vehicle M reaches at a sampling time for each predetermined sampling time. In this case, information on the target speed and the target acceleration is expressed by an interval between the trajectory points.

In generating the target trajectory, the action plan generation unit 140 may set an event of the automated driving. The event of the automated driving includes a constant speed traveling event, a low speed following traveling event, a lane change event, a branch event, a merge event, a takeover event, an avoidance event, and the like. The action plan generation unit 140 generates a target trajectory according to an activated event. A function of the traveling degree adjustment unit 142 of the action plan generation unit 140 will be described later.

The second control unit 160 controls the traveling driving force output device 200, the brake device 210, and the steering device 220 so that the subject vehicle M passes through the target trajectory generated by the action plan generation unit 140 at a scheduled time.

For example, the second control unit 160 includes an acquisition unit 162, a speed control unit 164, and a steering control unit 166. The acquisition unit 162 acquires information on the target trajectory (a trajectory point) generated by the action plan generation unit 140 and stores the information in a memory (not shown). The speed control unit 164 controls the traveling driving force output device 200 or the brake device 210 on the basis of a speed element accompanying the target trajectory stored in the memory. The steering control unit 166 controls the steering device 220 according to a degree of curvature of the target trajectory stored in the memory. For example, a process of the speed control unit 164 and the steering control unit 166 is realized by a combination of a feed-forward control and a feedback control. As an example, the steering control unit 166 executes a combination of a feed-forward control according to a curvature of the road ahead of the subject vehicle M and a feedback control based on the deviation from the target trajectory.

The traveling driving force output device 200 outputs, to driving wheels, traveling driving force (torque) for enabling the vehicle to travel. For example, the traveling driving force output device 200 includes a combination of an internal combustion engine, an electric motor, a transmission, and the like, and an electronic control unit (ECU) that controls the internal combustion engine, the electric motor, the transmission, and the like. The ECU controls the above-described constitutions according to the information input from the second control unit 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second control unit 160 or the information input from the driving operation element 80, so that a brake torque according to a control operation is output to each wheel. The brake device 210 may include a mechanism for transferring the oil pressure generated by an operation of a brake pedal included in the driving operation element 80 to the cylinder through a master cylinder as a backup. The brake device 210 is not limited to the constitution described above, and may be an electronic control method oil pressure brake device that controls an actuator according to the information input from the second control unit 160 to transfer the oil pressure of the master cylinder to the cylinder.

For example, the steering device 220 includes a steering ECU and an electric motor. For example, the electric motor changes a direction of steerable wheels by applying a force to a rack and pinion mechanism. The steering ECU changes the direction of the steerable wheels by driving the electric motor according to the information input from the second control unit 160 or the information input from the driving operation element 80.

[Function of Occupant Ride Determination Unit]

The occupant ride determination unit 110 determines whether or not an occupant is riding in the subject vehicle M. Specifically, the occupant ride determination unit 110 first analyzes the image captured by the vehicle interior camera 70, and determines whether or not feature information of a face or a body (an upper body, or the like) is included in the image. For example, the feature information of the face or the body is able to be extracted by pattern matching or the like by color or shape. In addition, in a case where it is determined that the feature information of the face or the body is included in the image, the occupant ride determination unit 110 determines that the occupant is riding in the subject vehicle M (that is, the subject vehicle M is in a manned state). In a case where it is determined that the feature information of the face or the body is not included in the image, the occupant ride determination unit 110 determines that the occupant is not riding in the subject vehicle M (that is, the subject vehicle M is in an unmanned state).

In a case where a load value of at least one seat among each of the seats detected by the load sensor 75 is equal to or more than a threshold value, the occupant ride determination unit 110 may determine that the occupant is riding in the subject vehicle M. In a case where a load value of all seats is less than the threshold value, the occupant ride determination unit 110 may determine that the occupant is not riding in the subject vehicle M.

For example, in a case where at least one of a determination result based on the image captured by the vehicle interior camera 70 or a determination result based on the load sensor 75 indicates that the occupant is riding in the subject vehicle M, the occupant ride determination unit 110 may determine that the subject vehicle M is in the manned state. The occupant ride determination unit 110 is able to suppress erroneous determination that an occupant rides in the subject vehicle M when baggage or the like is on the seat and improve accuracy of ride determination by performing both of the determination result based on the image captured by the vehicle interior camera 70 and the determination result based on the load sensor.

[Function of Priority Road Determination Unit]

The priority road determination unit 115 determines a road on which the subject vehicle M preferentially travels (hereinafter referred to as a priority road) on a route to the destination on the basis of a result determined by the occupant ride determination unit 110. For example, the priority road determination unit 115 differentiates a road on which the subject vehicle M is caused to travel between a case where it is determined that the occupant is riding in the subject vehicle M by the occupant ride determination unit 110 and a case where it is determined that the occupant is not riding in the subject vehicle M by the occupant ride determination unit 110.

Figure 3:
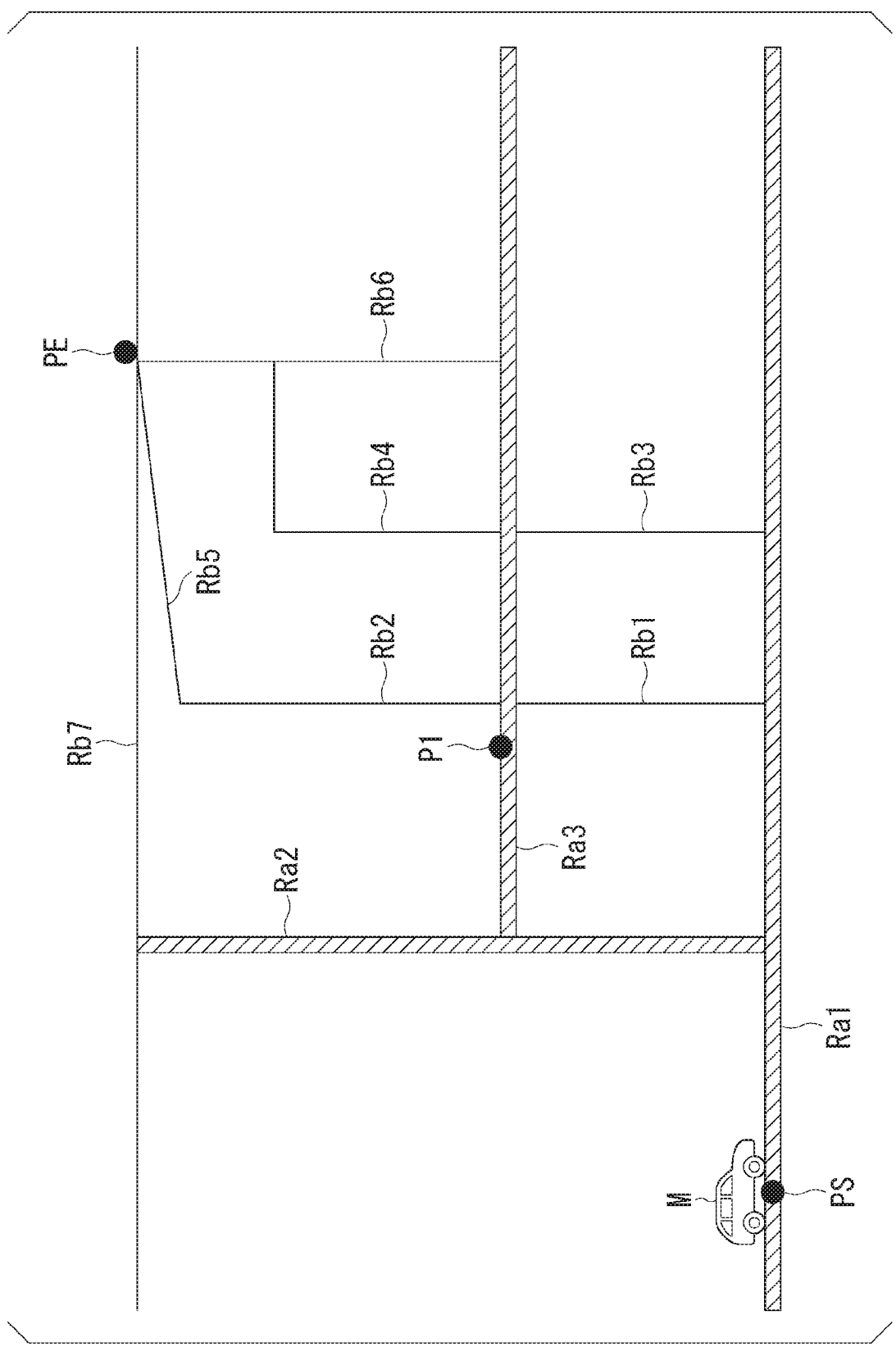
FIG. 3 is a diagram for explaining a process of a priority road determination unit.

FIG. 3 is a diagram for explaining a process of the priority road determination unit 115. In FIG. 3, a road on a map from a current position PS to a destination PE is shown. In the example of FIG. 3, roads Ra1 to Ra3 indicate a first road and roads Rb1 to Rb7 indicate a second road. The first road is, for example, a main road. For example, the first road is a road on which a change of a behavior of the subject vehicle M during traveling is smaller than a change of the behavior of the subject vehicle M on the second road or a change reference value of the behavior which is set in advance. For example, the change of the behavior is a change of a behavior caused by a right or left turn or acceleration or deceleration. For example, the small change includes a case in which the number of times a right or left turn or acceleration or deceleration is performed in a predetermined time or a predetermined distance (for example, the distance from the current position PS to the destination PE) is small or a change amount of steering amount or acceleration or deceleration is small. For example, the second road is a road such as a side street or an alley way. For example, the second road is a road on which the change of the behavior of the subject vehicle M is larger than that of the first road. For example, the large change includes a case in which the number of times a right or left turn or acceleration or deceleration is performed in the predetermined time or the predetermined distance is large or the change amount of the steering amount or the acceleration or deceleration is large. In the example of FIG. 3, it is assumed that a road other than the first and second roads is not included in the route from the current position PS to the destination PE. However, in embodiments, a road other than the first and second roads may be included. Types of such roads are set for each link by, for example, the first map information 54.

In a case where it is determined by the occupant ride determination unit 110 that the occupant is riding in the subject vehicle M, the priority road determination unit 115 determines the first roads Ra1 to Ra3 as the priority road. In a case where it is determined by the occupant ride determination unit 110 that the occupant is not riding in the subject vehicle M, the priority road determination unit 115 determines the second roads Rb1 to Rb7 as the priority road. The route determination unit 53 determines the on-map route in which the subject vehicle M travels more on the priority road determined by the priority road determination unit 115 and reaches the destination.

In the example of FIG. 3, in a case where the first road is determined as the priority road by the priority road determination unit 115, the route determination unit 53 determines a route Ra1→Ra2→Ra3→Rb6 of which a traveling degree of the first road with respect to a traveling distance is largest as the on-map route among the routes to the destination. Therefore, in a case where the subject vehicle M is in the manned state, the priority road determination unit 115 is able to improve ride comfort of the occupant by giving priority to the road on which the right or left turning or the acceleration or deceleration is small. In a case where the subject vehicle M is in the manned state, the priority road determination unit 115 causes the subject vehicle M to travel a large number of main roads and reach the destination earlier than traveling on the second road.

On the other hand, in a case where the second road is determined as the priority road by the priority road determination unit 115, the route determination unit 53 determines a route Ra1→Rb1→Rb2→Rb5 of which a traveling degree of the second road is largest as the on-map route. Therefore, in a case where the subject vehicle M is in the unmanned state, the priority road determination unit 115 is able to determine a route along which the subject vehicle M travels without concern for shaking or the like due to the change of the behavior of the subject vehicle M. In a case where the subject vehicle M is in the unmanned state, the priority road determination unit 115 is able to determine the second road as the route of the subject vehicle M in order to suppress concentration of vehicles on the main road and relieve traffic congestion on the main road.

In a case where it is determined by the occupant ride determination unit 110 that the occupant is not riding in the subject vehicle M, the priority road determination unit 115 may determine a route so that the subject vehicle M preferentially travels on a road with poor visibility among the second roads. For example, the road with poor visibility is a road on which a blind spot occurs due to a wall, a fence, or an obstacle such as a parked vehicle in the vicinity of the road having a predetermined road shape such as a T-shaped road or an intersection and thus it is estimated that it is impossible to fully recognize the surrounding situation of the subject vehicle M by the recognition unit 130. The priority road determination unit 115 may recognize the road with poor visibility on the basis of the road shape obtained from the first map information 54 and may recognize the road with poor visibility on the basis of the recognition result by the recognition unit 130.

As described above, in a case where the occupant is not riding in the subject vehicle M, the priority road determination unit 115 is able to relieve traffic congestion in, for example, a main road or a side street with relatively good visibility by causing the subject vehicle preferentially travel on the road with poor visibility. Since the occupant is not riding in the subject vehicle M, the action plan generation unit 140 is able to repeatedly perform acceleration and deceleration such as slowing down or stopping for avoiding contact with a nearby vehicle or the like without concern for a burden on the occupant.

[Function of Traffic Situation Recognition Unit]

The traffic situation recognition unit 132 recognizes a traffic situation of the on-map route. The traffic situation is, for example, a traffic congestion situation and a traffic blocking factor such as a traffic regulation due to other accidents, snow, or the like. For example, the traffic situation recognition unit 132 accesses an information providing server included in a system that monitors a traffic situation of roads such as vehicle information and communication system (VICS (registered trademark)) using the communication device 20, and recognizes a traffic situation on a traveling road or a future traveling road. The traffic situation recognition unit 132 may recognize the congestion situation of the traveling road on the basis of a position of the nearby vehicle recognized by the recognition unit 130, a speed of the nearby vehicle, a traveling speed of the subject vehicle with respect to the speed limit of the road, and the like.

In a case where the subject vehicle M travels on the road with poor visibility, the traffic situation recognition unit 132 may acquire information on the position or behavior of the nearby vehicle by performing inter-vehicle communication with the nearby vehicle using the communication device 20. Therefore, since the action plan generation unit 140 is able to more accurately understand the position or behavior of the nearby vehicle even on the road with poor visibility, the action plan generation unit 140 is able to cause the subject vehicle M to travel while reducing a possibility of contact with the nearby vehicle.

[Function of Traveling Degree Adjustment Unit]

The traveling degree adjustment unit 142 adjusts one or both of the traveling degree of the first road or the traveling degree of the second road on the basis of the traffic situation recognized by the traffic situation recognition unit 132. The traveling degree of the first road is a ratio or proportion of the first road among the routes from the current position PS to the destination PE. The traveling degree of the second road is a ratio or proportion of the second road among the routes from the current position PS to the destination PE.

For example, the traveling degree adjustment unit 142 derives the traveling degree of the first road and the traveling degree of the second road from the current position PS to the destination PE. In addition, in a case where it is recognized by the traffic situation recognition unit 132 that the main road (first road) on which the subject vehicle M is traveling is congested, the traveling degree of the first road is made smaller than the derived degree. In a case where it is recognized by the traffic situation recognition unit 132 that the main road (first road) on which the subject vehicle M is traveling is congested, the traveling degree adjustment unit 142 may increase the traveling degree of the second road as compared with the derived degree. In addition, the traveling degree adjustment unit 142 causes the route determination unit 53 to determine the route again on the basis of the adjusted traveling degree.

In the example of FIG. 3, in a case where the subject vehicle M is traveling on the route Ra1→Ra2→Ra3→Rb6 and when the subject vehicle M is traveling through a point P1, in a case where it is recognized by the traffic situation recognition unit 132 that the road Ra3 is congested, in the route to the destination PE, the traveling degree of the second road is increased, a route Rb2→Rb5 along which the subject vehicle M travels is determined again, and the subject vehicle M is caused to travel along the route that is determined again.

In a case where it is recognized by the traffic situation recognition unit 132 that neither road of the first roads Ra1 to Ra3 is congested, the traveling degree adjustment unit 142 may determine the route again so as to increase the traveling degree of the first road. The adjustment of the traveling degree by the traveling degree adjustment unit 142 may be performed during traveling to the destination or may be performed when the route determination unit 53 determines an initial on-map route. Therefore, the traveling degree adjustment unit 142 is able to cause the subject vehicle M to travel along a more suitable route on the basis of the traffic situation of the route to the destination PE.

[Process Flow]

Figure 4:
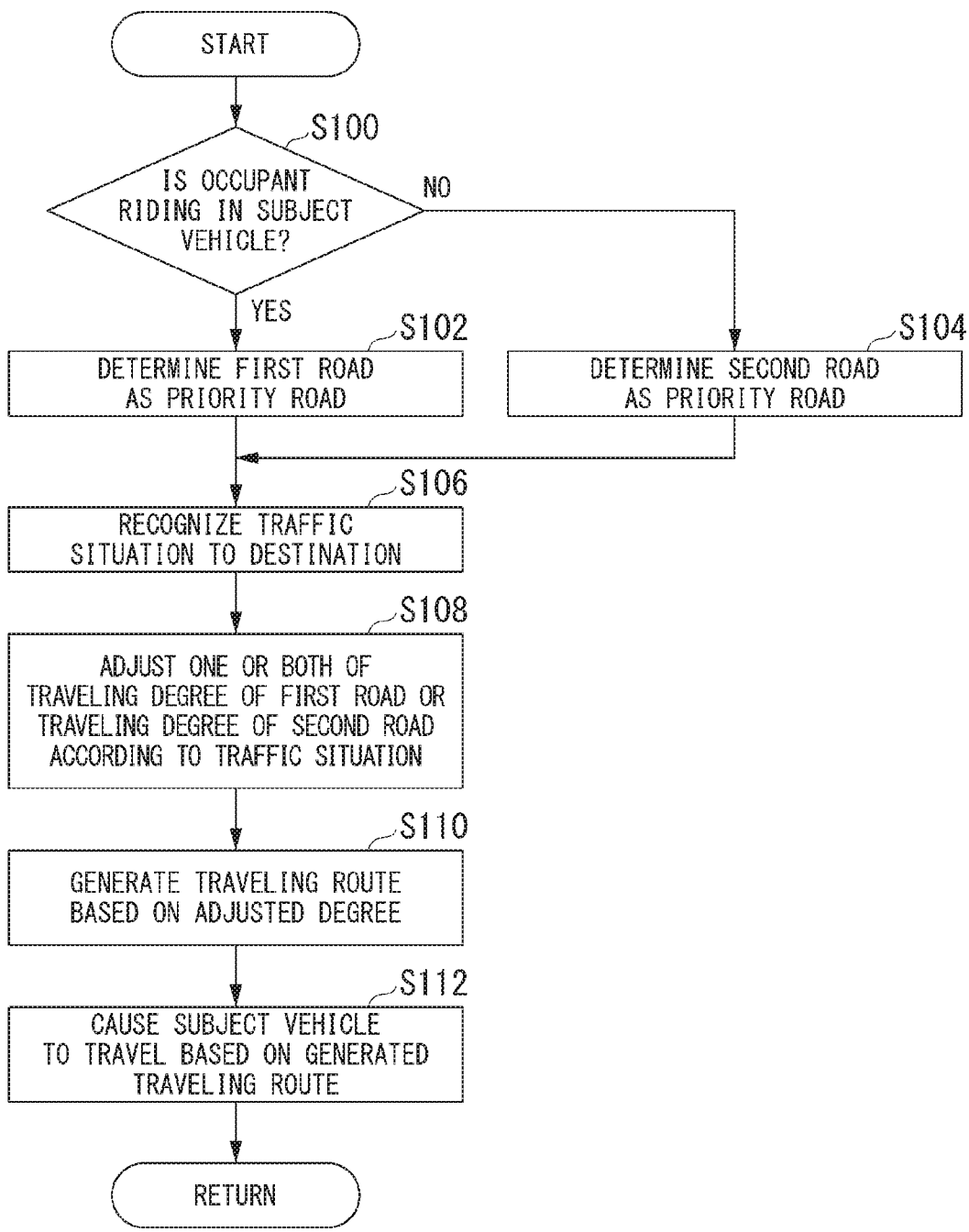
FIG. 4 is a flowchart showing a flow of a process executed by an automated driving control device according to the first embodiment.

FIG. 4 is a flowchart showing a flow of a process executed by the automated driving control device 100 according to the first embodiment. The process of the present flowchart may be executed at a predetermined period such as every time a destination is input by an occupant or at a predetermined timing.

First, the occupant ride determination unit 110 determines whether or not the occupant is riding in the subject vehicle M (step S100). In a case where it is determined that the occupant is riding in the subject vehicle M, the priority road determination unit 115 determines the first road as the priority road (step S102). In a case where it is determined that the occupant is not riding in the subject vehicle M, the priority road determination unit 115 determines the second road as the priority road (step S104).

Next, the traffic situation recognition unit 132 recognizes the traffic situation to the destination (step S106). Next, the traveling degree adjustment unit 142 adjusts one or both of the traveling degree of the first road or the traveling degree of the second road according to the traffic situation recognized by the traffic situation recognition unit 132 (step S108), and determines the traveling route to the destination on the basis of the adjusted traveling degree (step S110). Next, the traveling degree adjustment unit 142 generates the target trajectory on the basis of the determined traveling route, and causes the subject vehicle M to travel along the generated target trajectory (step S112). Therefore, the process of the present flowchart is ended.

As described above, according to the automated driving control device 100 of the first embodiment, in a case where the occupant is riding in the subject vehicle M, it is possible to perform traveling with a priority on the main road and the like with emphasis on ride comfort, and in a case where the occupant is not riding in the subject vehicle M, it is possible to perform traveling with a priority on the side street or the like on which the number of right or left turns or acceleration and decelerations is large. Therefore, the automated driving control device 100 according to the first embodiment is able to suppress the concentration of vehicles on the main road and perform more suitable driving control according to whether or not the occupant is riding in the vehicle.

Second Embodiment

Figure 5:
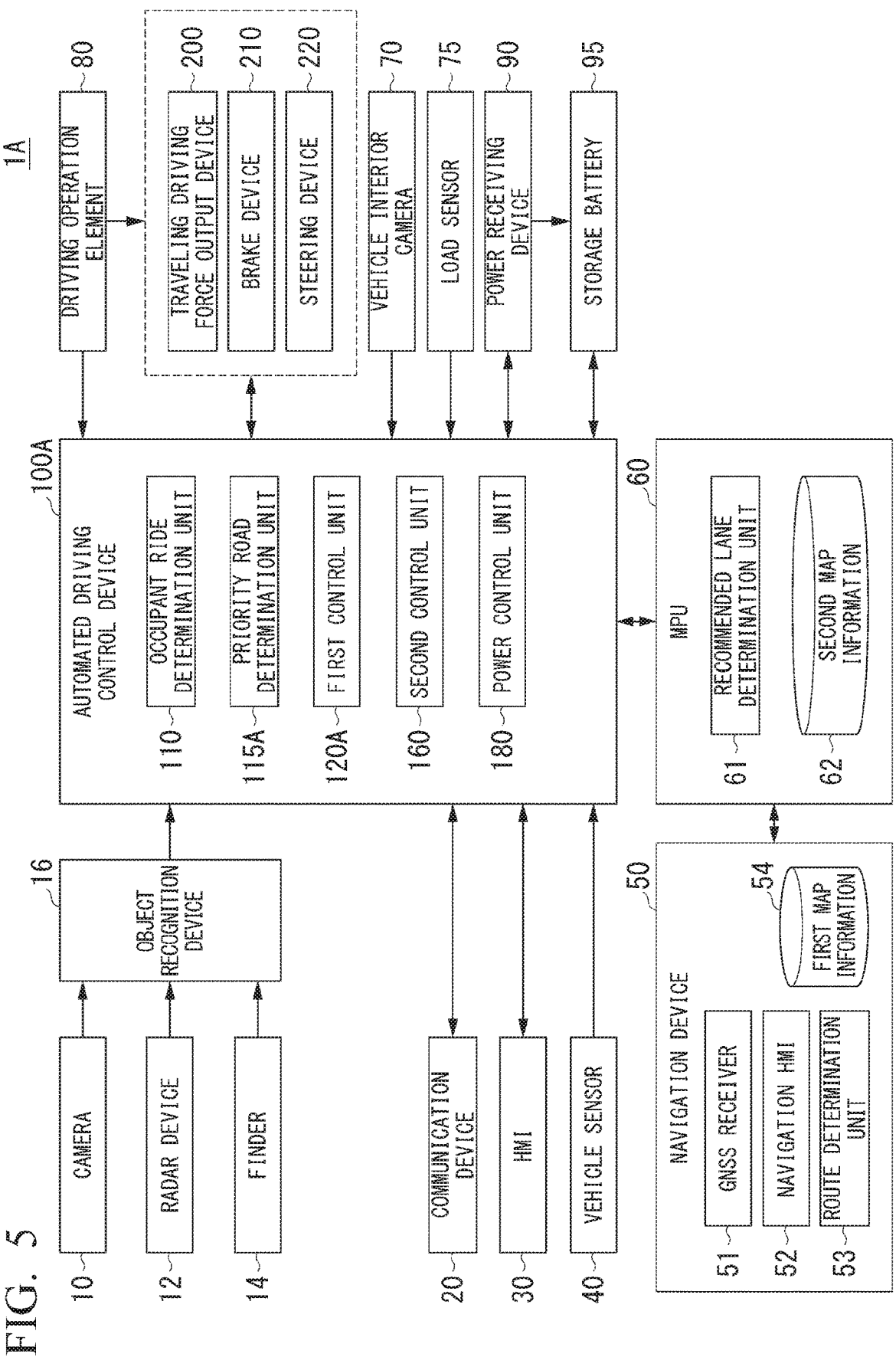
FIG. 5 is a diagram showing an example of a constitution of a vehicle on which a vehicle system of the second embodiment is mounted.

Next, a vehicle system 1A according to a second embodiment will be described. FIG. 5 is a diagram showing an example of a constitution of a vehicle in which the vehicle system 1A of the second embodiment is mounted. The vehicle system 1A is different from the vehicle system 1 of the first embodiment in that a power receiving device 90 and a storage battery 95 are provided, and an automated driving control device 100A is provided instead of the automated driving control device 100. The vehicle of the second embodiment is applied to an automated driving vehicle and is applied to a hybrid vehicle or an electric vehicle that is able to drive a vehicle by using electric power stored in the storage battery 95. Hereinafter, differences from the first embodiment will be mainly described, and descriptions of functions and the like common to the first embodiment will be omitted. The automated driving control device 100A is an example of the "vehicle control device".

For example, the power receiving device 90 receives electric power from a charging lane in a case where the subject vehicle M is traveling on the charging lane. Specifically, the power receiving device 90 includes a pickup coil on a bottom surface of the subject vehicle M, causes each resonator of the pickup coil and a power transmission coil embedded on a charging lane side to be resonated by a magnetic field, and receives the electric power from the charging lane side. The power receiving device 90 is able to acquire the electric power by converting a high frequency generated by the resonance into a direct current by a rectifier circuit. Instead of the magnetic field resonance method described above, for example, the power receiving device 90 may perform non-contact electric power transmission by an electromagnetic induction method or the like of receiving power by using induced magnetic flux generated between a power transmission side and a power receiving side.

The storage battery 95 accumulates the electric power supplied by the power receiving device 90. The storage battery 95 is, for example, a secondary battery such as a lithium ion battery.

For example, the automated driving control device 100A includes the occupant ride determination unit 110, a priority road determination unit 115A, a first control unit 120A, the second control unit 160, and a power control unit 180. The power control unit 180 manages a state of charge (SOC) of the storage battery 95, and controls timings of start and end of power reception in the power receiving device 90 on the basis of a charging rate in a case where the subject vehicle M travels on the charging lane. The power control unit 180 supplies the electric power to each device in the vehicle system 1A using the electric power from the storage battery 95, and controls the traveling of the subject vehicle M by the second control unit 160 by the electric power. A combination of the occupant ride determination unit 110, the priority road determination unit 115A, an action plan generation unit 140A, the second control unit 160, and the power control unit 180 is an example of the "driving control unit".

Figure 6:
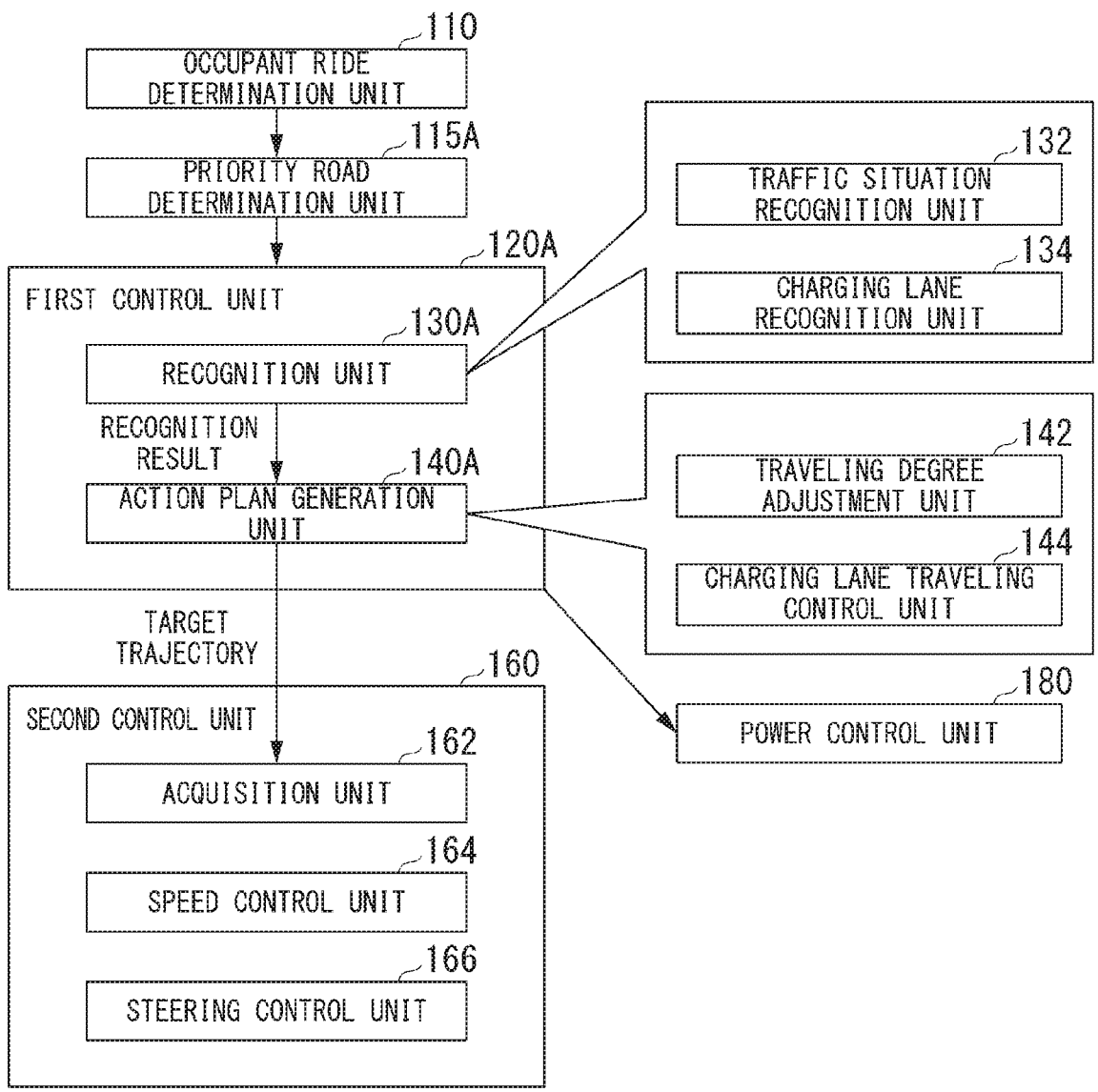
FIG. 6 is a functional constitution diagram of the occupant ride determination unit, a priority road determination unit, a first control unit, the second control unit, and a power control unit.

FIG. 6 is a functional constitution diagram of the occupant ride determination unit 110, the priority road determination unit 115A, the first control unit 120A, the second control unit 160, and the power control unit 180. The first control unit 120A includes, for example, a recognition unit 130A and the action plan generation unit 140A.

Figure 7:
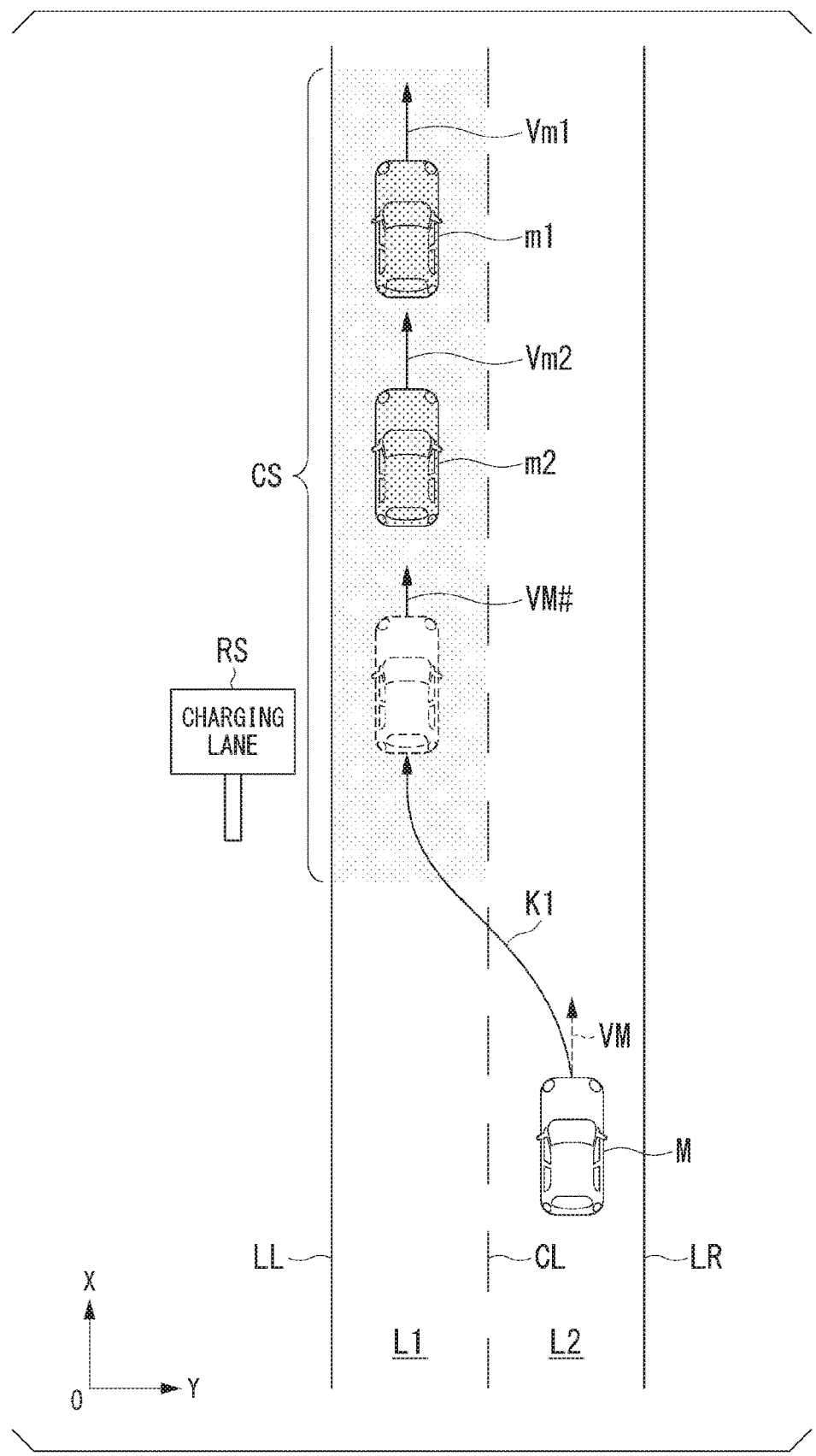
FIG. 7 is a diagram for explaining processes of a charging lane recognition unit and a charging lane traveling control unit.

The recognition unit 130A further includes a charging lane recognition unit 134 as compared with the recognition unit 130 of the first embodiment. The action plan generation unit 140A further includes a charging lane traveling control unit 144 as compared with the action plan generation unit 140 of the first embodiment. Therefore, hereinafter, the charging lane recognition unit 134 and the charging lane traveling control unit 144 will be mainly described. FIG. 7 is a diagram for explaining processes of the charging lane recognition unit 134 and the charging lane traveling control unit 144. In the example of FIG. 7, roads of two lanes L1 and L2 progressing in the same direction (X direction in the drawing) partitioned by road lane markings LL, CL, and LR are shown. In the example of FIG. 7, the subject vehicle M traveling on the land L2 at a speed VM and nearby vehicles m1 and m2 traveling on the land L1 at respective speeds Vm1 and Vm2 are shown.

For example, the charging lane recognition unit 134 recognizes a charging lane section CS in the route to the destination with reference to the first map information 54. The charging lane recognition unit 134 may recognize the charging lane section CS on the basis of a road sign RS indicating the charging lane present in the progress direction of the subject vehicle M, a mark, a pattern, a color, or the like indicating the charging lane drawn on a road surface recognized by the recognition unit 130A.

In a case where it is determined that the occupant is not riding in the subject vehicle M by the occupant ride determination unit 110 and the charging lane section CS is recognized by the charging lane recognition unit 134, the priority road determination unit 115A determines the charging lane as the priority road. The priority road determination unit 115A may determine the charging lane as the priority road in a case where the charging rate of the storage battery 95 is equal to or less than a threshold value. Therefore, the priority road determination unit 115A is able to suppress lane change or speed control at a scene where charging is not required.

In a case where the charging lane is determined as the priority road by the priority road determination unit 115A, the charging lane traveling control unit 144 generates a target trajectory traveling in the charging lane section CS. In the example of FIG. 7, a target trajectory K1 for changing the lane from the lane L2 to the lane L1 is generated.

In a case where the subject vehicle M travels on the charging lane, the power control unit 180 causes the power receiving device 90 to start the power reception, and ends the power reception in a case where the charging rate reaches an upper limit value. In a case where the charging lane section CS ends, the power control unit 180 ends the power reception by the power receiving device 90.

Here, in a case where the subject vehicle M travels in the charging lane section CS, the charging lane traveling control unit 144 may cause the subject vehicle M to travel at a speed VM# generated by reducing the speed of the subject vehicle M by a predetermined amount as compared with a speed VM at which the subject vehicle M travels in a region other than the charging lane section CS (for example, the lane L2). For example, the predetermined amount may be set on the basis of the speed limit of the lane, the presence or absence of the surrounding vehicle, or a relative distance to the surrounding vehicle, or may be a fixed amount. It is possible to receive power for a longer time by decelerating the subject vehicle M while the subject vehicle M travels on the charging lane. Since the lane change to the charging lane and the speed control are performed in a state in which the occupant is not riding in the subject vehicle M, it is possible to perform more suitable driving control without concern to a burden of the occupant or the like due to the change of the behavior of the subject vehicle M. In a case where the power reception by the power receiving device 90 is ended, the charging lane traveling control unit 144 performs control to return the speed of the subject vehicle M to the speed before traveling on the charging lane.

As shown in FIG. 7, instead of a case where there is the charging lane on at least one lane of a plurality of lanes on which vehicles are able to progress in the same direction, in a case where there is the charging lane in another route, the charging lane traveling control unit 144 may perform control to change the route to a route along which the subject vehicle M travels on the charging lane and cause the subject vehicle M to travel on the charging lane. The charging lane traveling control unit 144 may cause the route determination unit 53 to determine a route giving priority to the charging lane when the route determination unit 53 determines the on-map route by the route determination unit 53 (that is, in the determining of the priority road).

[Process Flow]

Figure 8:
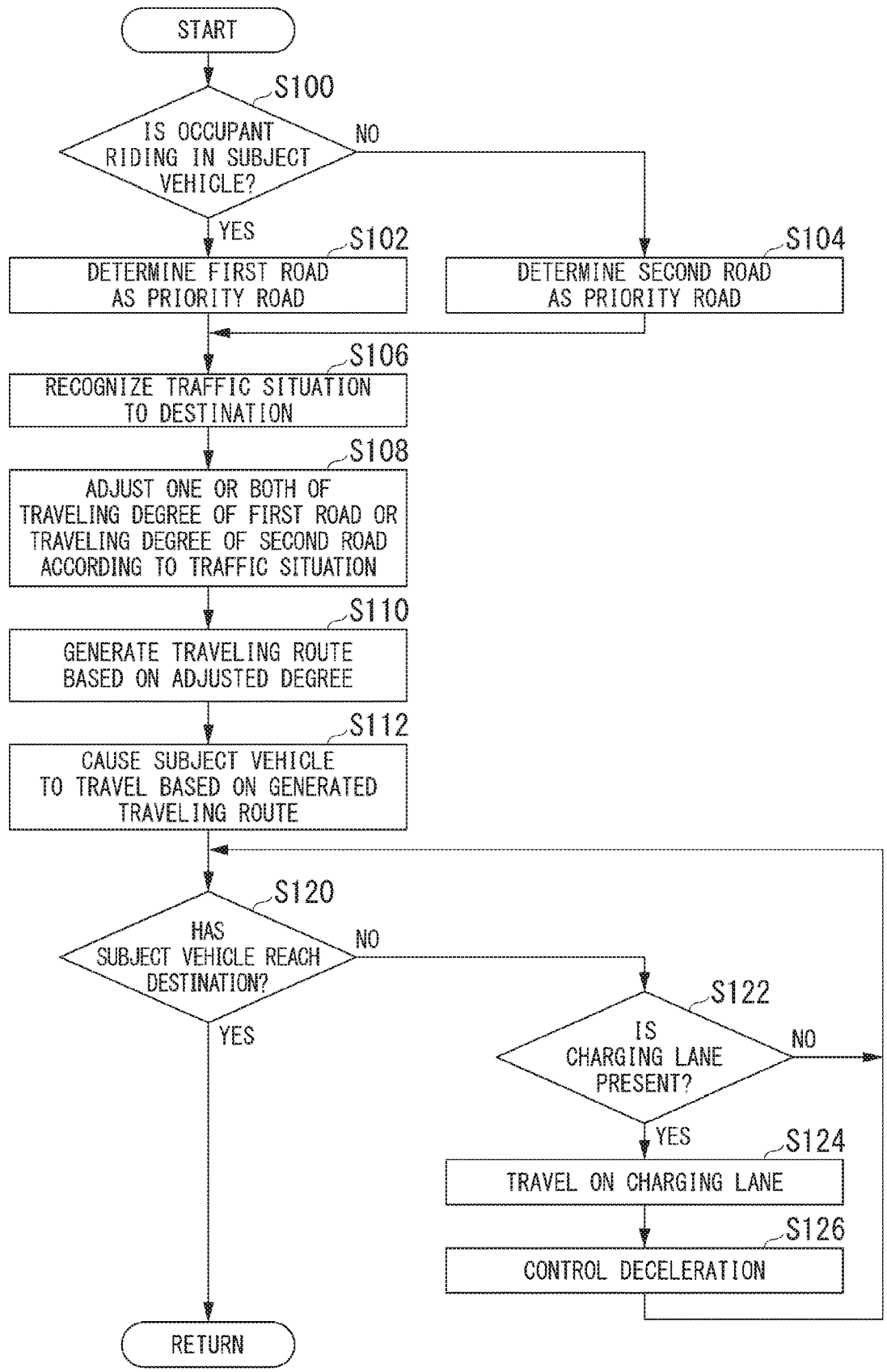
FIG. 8 is a flowchart showing a flow of a process executed by the automated driving control device of the second embodiment.

FIG. 8 is a flowchart showing a flow of a process executed by the automated driving control device 100A of the second embodiment. The process of the second embodiment further includes processes of steps S120 to S126 as compared with the process of the first embodiment described above. Therefore, hereinafter, the processes of steps S120 to S126 will mainly be described.

After the process of step S112, the automated driving control device 100A determines whether or not the subject vehicle M has reached the destination (step S120). In a case where it is determined that the vehicle has not reached the destination, the charging lane recognition unit 134 determines whether or not the charging lane is present on the road on which the subject vehicle M is traveling (step S122). In a case where it is determined that the charging lane is present, since the charging lane is determined as the priority road by the priority road determination unit 115A, the charging lane traveling control unit 144 causes the subject vehicle M to travel on the charging lane (step S124) and performs control to decelerate the subject vehicle M (step S126). In the process of step S126, after the section of the charging lane ends or in a case where the charging rate is equal to or greater than the threshold value, the speed of the subject vehicle M is returned to the speed before traveling on the charging lane, and the process returns to the process of step S120. In the process of step S122, in a case where the charging lane is not present, the process returns to the process of step S120. In the process of step S120, in a case where the subject vehicle M reaches the destination, the process of the present flowchart is ended.

According to the second embodiment described above, in addition to the same effects as those of the first embodiment, in a case where the occupant is not riding in the subject vehicle M, the subject vehicle M travels on the charging lane to charge the storage battery 95. Thus, it is possible to complete charging when the occupant rides. Therefore, in a case where the occupant rides the subject vehicle M at the destination PE, the occupant is able to use electric power with a margin.

[Hardware Constitution]

Figure 9:
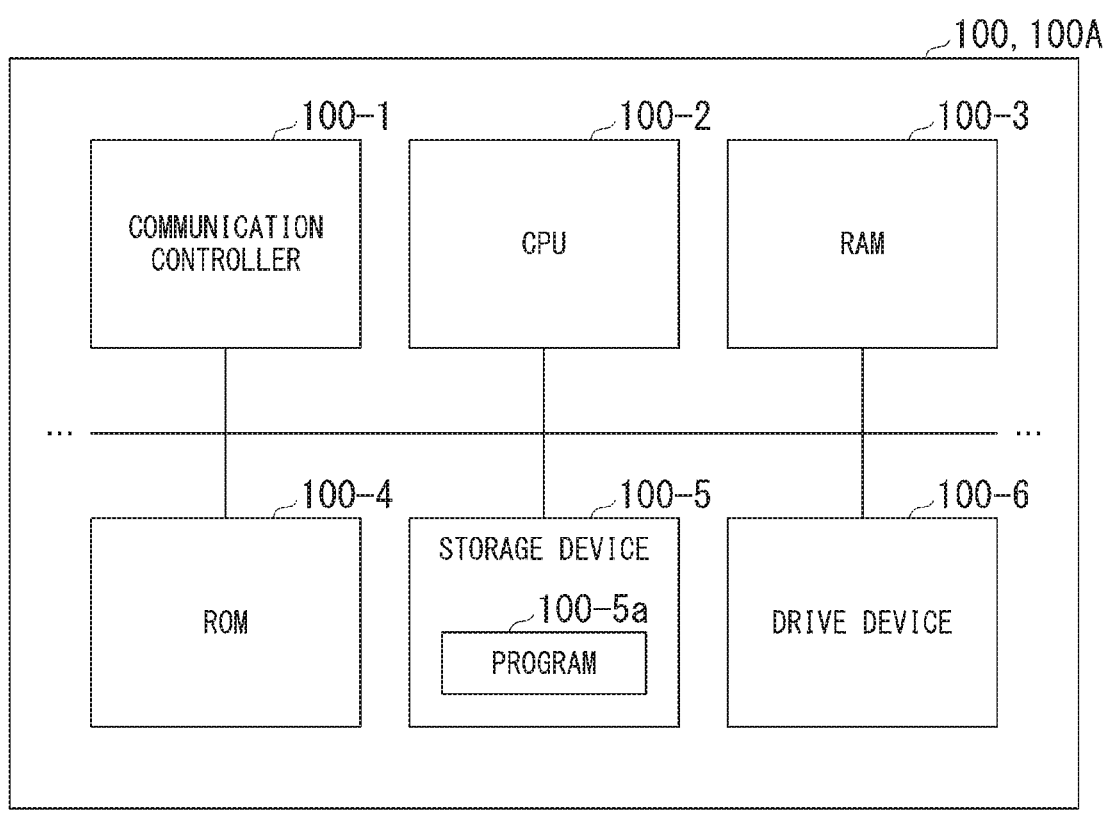
FIG. 9 is a diagram showing an example of a hardware constitution of the automated driving control device according to an embodiment.

FIG. 9 is a diagram showing an example of a hardware constitution of the automated driving control device 100 or 100A according to an embodiment. As shown in the figure, the automated driving control device 100 or 100A includes a constitution in which a communication controller 100-1, a CPU 100-2, a RAM 100-3 used as a working memory, a ROM 100-4 storing a boot program and the like, a storage device 100-5 such as a flash memory or an HDD, a drive device 100-6 and the like are mutually connected by an internal bus or a dedicated communication line. The communication controller 100-1 communicates with components other than the automated driving control device 100. A portable storage medium (for example, a computer readable non-transitory storage medium) such as an optical disk is attached to the drive device 100-6. A program 100-5a executed by the CPU 100-2 is stored in the storage device 100-5. This program is developed in the RAM 100-3 by a direct memory access (DMA) controller (not shown) or the like and executed by the CPU 100-2. The program 100-5a referred to by the CPU 100-2 may be stored in the portable storage medium attached to the drive device 100-6 or may be downloaded from another device through the network. Therefore, a part or all of the occupant ride determination unit 110, the priority road determination unit 115, the first control unit 120, and the second control unit 160 of the automated driving control device 100 is realized. Alternatively, a part or all of the occupant ride determination unit 110, the priority road determination unit 115A, the first control unit 120A, the second control unit 160, and the power control unit 180 of the automated driving control device 100A is realized.

The above-described embodiment is able to be expressed as follows.

A vehicle control device including:

a storage device that stores a program; and a hardware processor, wherein the hardware processor executes the program stored in the storage device to:

recognize a surrounding situation of a vehicle;

control one or both of steering or acceleration and deceleration of the vehicle based on the recognized surrounding situation;

determine whether or not an occupant is riding in the vehicle; and differentiate a road on which the vehicle is caused to travel, between a case where it is determined that the occupant is riding in the vehicle and a case where it is determined that the occupant is not riding in the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a processor;
   a storage battery that accumulates electric power;
   a power receiving device; and
   a memory that stores executable instructions that, when executed by the processor, facilitate performance of operations, comprising:
      recognizing a surrounding situation of a vehicle,
      controlling one or both of steering or acceleration and deceleration of the vehicle based on the recognizing the surrounding situation,
      determining whether or not an occupant is riding in the vehicle,
      differentiating a road on which the vehicle is caused to travel, between a case where it is determined that the occupant is riding in the vehicle and a case where it is determined that the occupant is not riding in the vehicle,
      in the case where it is determined that the occupant is riding in the vehicle, causing the vehicle to preferentially travel on a main road, and
      in the case where it is determined that the occupant is not riding in the vehicle, causing the vehicle to preferentially travel on a road other than the main road,
   wherein the power receiving device supplies the electric power to the storage battery by the vehicle traveling on a charging lane for charging the storage battery, and wherein the operations further comprise, in the case where it is determined that the occupant is not riding in the vehicle, causing the vehicle to preferentially travel on the charging lane.

2. The vehicle control device of claim 1, wherein the main road comprises a first road on which a change of a behavior of the vehicle is small, and wherein he road other than the main road comprises a second road on which the change of the behavior of the vehicle is larger as compared with the first road.

3. The vehicle control device of claim 2, wherein the operations further comprise adjusting one or both of a traveling degree of the first road or a traveling degree of the second road in a route to a destination based on the recognizing of the surrounding traffic situation of the vehicle.

4. The vehicle control device of claim 1, wherein the operations further comprise decelerating a speed of the vehicle in a case where the vehicle travels on the charging lane as compared with a case where the vehicle travels on a lane other than the charging lane.

5. The vehicle control device of claim 1, wherein the operations further comprise, in the case where it is determined that the occupant is not riding in the vehicle, causing the vehicle to preferentially travel on a road with poor visibility from the vehicle.

6. A vehicle control method of causing a vehicle control device comprising a storage battery and a power receiving device to:
   recognize a surrounding situation of a vehicle;
   control one or both of steering or acceleration and deceleration of the vehicle based on the recognized surrounding situation;
   determine whether or not an occupant is riding in the vehicle; and
   differentiate a road on which the vehicle is caused to travel, between a case where it is determined that the occupant is riding in the vehicle and a case where it is determined that the occupant is not riding in the vehicle, wherein in the case where it is determined that the occupant is riding in the vehicle, cause the vehicle to preferentially travel on a main road, and in the case where it is determined that the occupant is not riding in the vehicle, cause the vehicle to preferentially travel on a road other than the main road, wherein the storage battery accumulates electric power, wherein the power receiving device supplies the electric power to the storage battery by the vehicle traveling on a charging lane for charging the storage battery, and wherein in the case where it is determined that the occupant is not riding in the vehicle, causing the vehicle to preferentially travel on the charging lane.

7. A computer-readable non-transitory storage medium storing a program that causes a vehicle control device equipped with a storage battery and a power receiving device to:
   recognize a surrounding situation of a vehicle;
   control one or both of steering or acceleration and deceleration of the vehicle based on the recognized surrounding situation;
   determine whether or not an occupant is riding in the vehicle; and
   differentiate a road on which the vehicle is caused to travel, between a case where it is determined that the occupant is riding in the vehicle and a case where it is determined that the occupant is not riding in the vehicle, wherein in the case where it is determined that the occupant is riding in the vehicle, cause the vehicle to preferentially travel on a main road, and in the case where it is determined that the occupant is not riding in the vehicle, cause the vehicle to preferentially travel on a road other than the main road, wherein the storage battery accumulates electric power, wherein the power receiving device supplies the electric power to the storage battery by the vehicle traveling on a charging lane for charging the storage battery, and wherein in the case where it is determined that the occupant is not riding in the vehicle, causing the vehicle to preferentially travel on the charging lane.

* * * * *